E. B. WILLIAMS.
RELEASING DEVICE FOR GRAPPLES.
APPLICATION FILED OCT. 5, 1912.
1,071,489.
Patented Aug. 26, 1913.
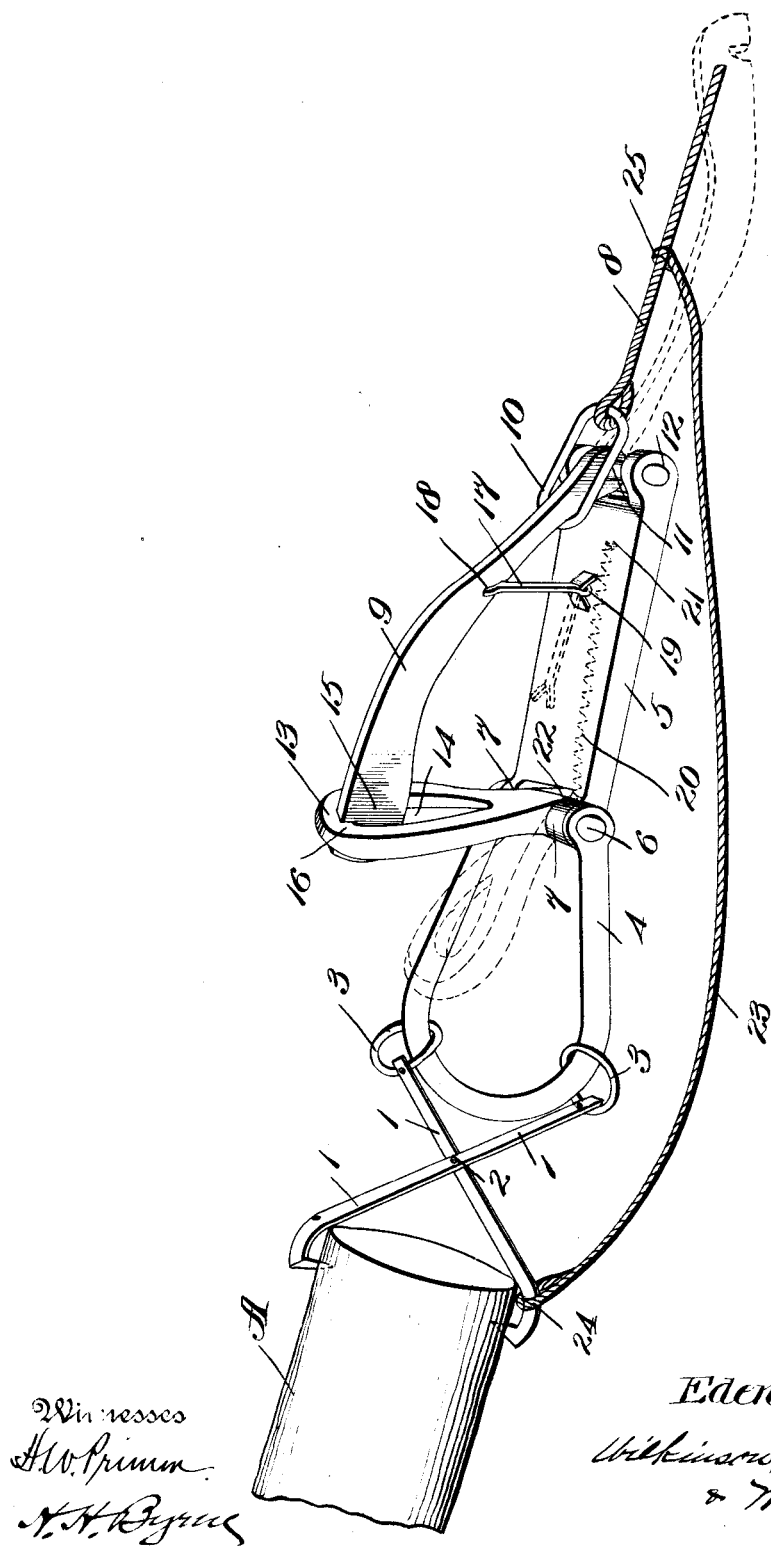
Witnesses
Inventor
Eden B. Williams,
Wilkinson, Witherspoon
& MacKaye
Attorneys

UNITED STATES PATENT OFFICE.

EDEN BIRE WILLIAMS, OF CHAMBERLIN, LOUISIANA.

RELEASING DEVICE FOR GRAPPLES.

1,071,489.  Specification of Letters Patent.  Patented Aug. 26, 1913.

Application filed October 5, 1912. Serial No. 724,092.

*To all whom it may concern:*

Be it known that I, EDEN BIRE WILLIAMS, a citizen of the United States, residing at Chamberlin, in the parish of West Baton Rouge and State of Louisiana, have invented certain new and useful Improvements in Releasing Devices for Grapples; and I do hereby declare the following to be a full, clear, and exact description of the invention, such as will enable others skilled in the art to which it appertains to make and use the same.

The present invention relates to grapples used in connection with log hauling apparatus and the like, and more especially to a device for automatically effecting the release of the grapple from the log when the log has been brought to the desired position; and wherein the device will be positive in its operation; and which is of simple and durable construction.

In hauling logs, it frequently happens that the workmen are injured and, in fact, oftentimes kill by the rolling logs, such accidents happening while said workmen are manually removing the grapples from the logs, as is generally practiced.

It is therefore the purpose of the present invention to provide an arrangement which will accomplish the result desired (*i. e.*, the automatic release of the grapple) by the same hauling power that is used for moving the logs.

With these and other objects in view the invention consists in the novel details of construction and combinations of parts more fully hereinafter disclosed and particularly pointed out in the claim.

The accompanying drawing illustrates the device and its manner of application.

Referring to the construction in detail, 1 indicates the grapple or tongs consisting of a pair of bars having hooked ends for engaging in the log A, and pivoted together at 2, as in the usual manner. A pair of rings 3 are carried by the free ends of the grapple arms and have loose engagement with a shackle 4, that is in turn pivotally connected to a link or casing 5 through the medium of a bolt or pin 6 that is mounted in lugs 7, formed on one end of said link 5. The link 5 has connection with a link 10 on the hauling line or chain 8 through the medium of a hook or bar 9 which is pivotally mounted on said link. The hook 9 is pivotally mounted on a pin 11, that is secured to lugs 12 on the opposite end of the link, as shown. The hook 9 is normally held in position during the strain incident to hauling by a latch 13, that is pivotally mounted on the shackle bolt 6 between the lugs 7, said latch having an opening 14 through which the enlarged end 15 of the hook passes. Said enlarged portion of the hook is cut away, as at 16, whereby to engage with the latch 13 and hold the parts in secured relation and against rattling. When the hook and latch are engaged, *i. e.*, just previous to hauling the log, said hook is automatically held in position through the medium of a support or trigger 17 that has a bifurcated end 18 for engaging said hook, and is pivotally mounted at 19 to the link 5.

The several parts are held in the position shown by full lines in the drawing just before the log is hauled, but immediately strain is exerted on the hook 9, the trigger 17 will fall through its own weight to the position shown in broken lines, and thereafter said hook is held in engagement with the latch 13 by the strain on the cable or chain 8. When said strain is released, as for instance when the log has been hauled to position, the hook 9 will fall by gravity due to its weighted end 15, and when thus released from the latch 13, said latch will fall into substantially that position shown in broken lines. To insure the falling of the latch 13, there is provided a spring 20 secured at one end 21 to the link 5, and at its other end to a downward 22 of the latch 13. The disconnection between the hook 9 and latch 13 prevents any further hauling of the log, for when the chain or cable 8 is again drawn, said hook 9 turns on its pivot 11 and allows the link 10 to be slipped from engagement therewith, as will be understood.

The means for disengaging the grapple from the log, after the hauling connection has been automatically disengaged, consists of a line or chain 23 connected at its respective ends 24 and 25 to one arm of the grapple and the cable 8. With this device, the further pulling on the cable 8 operates to pull on the line 23 and this in turn pulls on the grapple and operates to disengage the same from the log when the whole apparatus is released and free to be used for further hauling.

It will be seen from the foregoing that the logs may be hauled as in the usual manner and with the same ease as heretofore, and in addition the hauling device may be automatically released when desired. And it will be further noted that the present device dispenses with the services of those whose duty it is to manually release the grapple hooks, and in addition saves the employer from the liability of workmen being maimed or killed in the line of labor.

It is obvious that those skilled in the art may vary the details of construction and arrangement of parts without departing from the spirit of my invention, and therefore I do not wish to be limited to such features except as may be required by the claim.

What I claim is:—

The combination with a grapple of means for closing and hauling the same comprising a link, a hook pivotally mounted on the link, a hauling line or cable detachably connected to said hook, a latch pivotally mounted on the link and adapted for engaging with said hook and holding the same through strain on said line, a device for temporarily holding said hook in engagement with said latch, said latch adapted to be automatically disengaged from said hook when strain is removed from the line, a spring for throwing said latch into disengaging position, and a line having its respective ends connected with the grapple and said hauling line for disengaging said grapple after the disconnection of said hauling line, substantially as described.

In testimony whereof, I affix my signature, in presence of two witnesses.

EDEN BIRE WILLIAMS.

Witnesses:
 FRANK BOYER,
 L. H. BROUSSARD.

Copies of this patent may be obtained for five cents each, by addressing the "Commissioner of Patents, Washington, D. C."